(No Model.)
J. H. VAN DE WATER.
HARVESTER CUTTER BAR.
No. 353,899. Patented Dec. 7, 1886.
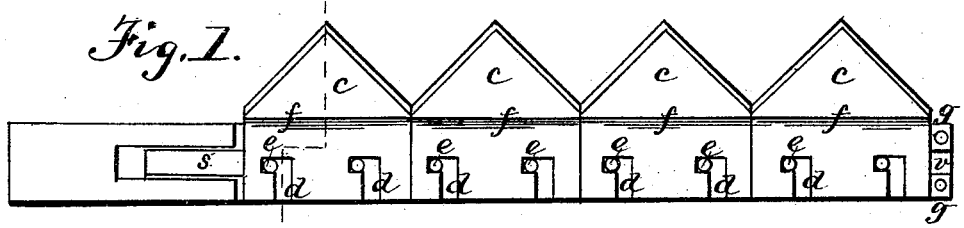
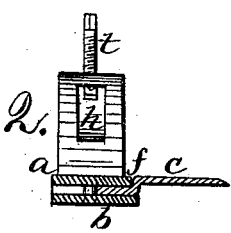
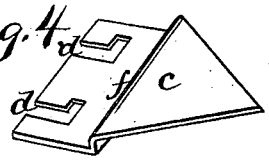
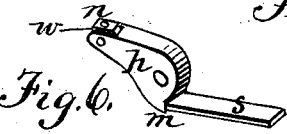
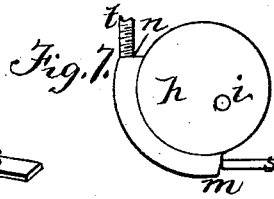
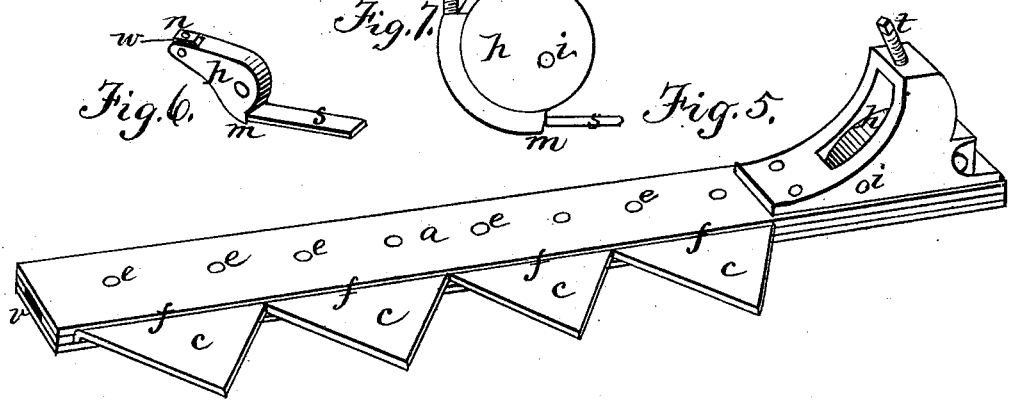
Witnesses:
A. C. Rawlings
T. O. McCleary
Inventor:
James H. Van De Water
by his Atty's
Johnson and Johnson

UNITED STATES PATENT OFFICE.

JAMES H. VAN DE WATER, OF AUBURN, NEW YORK.

HARVESTER CUTTER-BAR.

SPECIFICATION forming part of Letters Patent No. 353,899, dated December 7, 1886.

Application filed May 6, 1886. Serial No. 201,335. (No model.)

*To all whom it may concern:*

Be it known that I, JAMES H. VAN DE WATER, a citizen of the United States, residing at Auburn, in the county of Cayuga and State of New York, have invented new and useful Improvements in Harvester Cutter-Bars, of which the following is a specification.

My invention relates to cutter-bars for reaping and mowing machines, and my improvement therein is directed to means whereby the separate cutter-sections are secured in the bar in a manner to maintain a firm connection therein, with provision for permitting any one of the sections to be removed from the bar, in case of injury, without taking out any other section.

Various constructions of cutter-bars with separate slotted cutter-sections secured therein by abutting screws, and slide-bars for binding the sections against each other within the bar, have been proposed, in which provision has been made for the separate removal of the blade-sections; and my improvement consists in the special provision by which the cutter-sections are held in firm relation to each other in the bar, and allow any one or all of them to be removed from the bar, as may be found necessary.

The drawings represent in Figure 1 my improved cutter-bar in plan view with the top part of the bar removed. Fig. 2 shows a cross-section of the same. Fig. 3 is a vertical section showing the cam device for securing the blade-sections in the bar, and Fig. 4 shows one of the cutter-sections. Fig. 5 shows the cutter-bar in perspective, and Fig. 6 is the cam holding device for the cutter-sections, and Fig. 7 shows a modified form of the cam-lever device for the cutter-sections.

The cutter-bar is preferably made of two parts—a top part, *a*, and a bottom part, *b*—secured together in any suitable manner so as to leave a space between them open at the front of the bar to receive the cutter sections or blades *c*, which have ∠-shaped slots *d* at their rear ends near each corner. The cutter-sections are of the usual V form, and are secured within the bar by rivet-pins *e*, passing through the slots *d*, which are open at the rear edge of the cutter-shank, said pins being riveted in the top and bottom parts of the bar, as is common in cutter-bars provided with removable slotted cutter-sections. The blade proper of the cutter and its slotted part are made in different planes, there being a vertical angular bend, *f*, at the base of the cutting-edge standing parallel with the rear edge of the cutter-shank, so as to bring the upper face of each cutter-section on a level with the top surface of the cutter-bar, so as to avoid a top shoulder or ridge at the base of the cutting-edge which joins the front edge of the cutter-bar.

In forming the knife the blades are inserted into the bar-space over the rivets *e*, so that the latter will be in that part of each ∠-shaped slot *d* which is lengthwise of the bar. The outer end cutter-section abuts against a solid part, *g*, of the bar, and each section will bear upon each other with the rivets in the slots, as stated. At the inner end of the bar the terminal cutter-section does not join a solid part of the bar, but is firmly pressed against the next cutter-section, thus binding all the sections in the length of the bar by my improved fastening device, which I will now describe.

A vertical opening is formed in the inner end of the bar to receive a cam, *h*, in vertical position, the pivot-pin *i* whereof is placed eccentric thereto, for a purpose which I shall presently describe. The cam has faces *m* and *n*, one of which, *m*, stands down nearly in vertical line with the pivot *i* of the cam, and the other, *n*, stands nearly in a horizontal plane above the lower cam-face, and at one side of its pivot. The cam-faces are made as shown, and the lower one abuts against the end of a loose pin, *s*, seated horizontally in a groove in the metal of the bar, so as to abut against the end cutter-section in the line, or nearly so, of the rivet-pins which confine the cutter-sections within the bar. The upper cam-face abuts against the end of a screw, *t*, which is placed vertically in the top part of the bar, and acts when screwed down to drive the lower cam-face with considerable leverage against the abutting loose pin *s*, to drive it hard against the cutter-sections and maintain said pin in such adjustment in a manner to render the cutter-sections as firmly bound, one upon the other, as if they were a single plate. This is the important matter of such cam, screw, and pin device, for if the screw abutted directly against the loose pin *s* its effectiveness as a hold for the cutter-sections would be lessened to such an extent as to fail to give the required firmness to the cutter-sections within the bar.

The placing of the cam-faces at right angles, or nearly so, and forming them as shown, gives the advantage of considerable leverage and greater force to bind the loose pin upon the cutter-sections, and also the advantage of very little friction upon the end of the pin and upon the end of the screw. The threads of the screw are relieved from the great strain which is borne by the intermediate cam, because the screw, being at right angles to the direct force exerted upon the binding-pin, acts by leverage through the cam upon the abutting pin, and the binding force is thereby greatly increased, while the screw is relieved from the direct abutting pressure and held to its adjustment as firmly as if it were held by a lock-nut.

I prefer to make the cam-bearing $n$ for the adjusting-screw $t$ in a seat, $w$, formed in a separate metal piece pivoted in the open upper end of the cam-lever, so as to relieve the screw from lateral strain or pressure in driving the cam down, because as the cam is forced down the pivoted seat will form a self-adjusting bearing for the driving-screw. I may, however, make the cam with its acting face $m$ on an arc, as shown in Fig. 7, so as to give little friction upon the end of the pin $s$ when adjusting the cam. The other cam-face, $n$, is also made on an arc, to relieve the friction of the screw in forcing down the cam. In this construction the cam bearing-faces are formed upon a disk which is pivoted at $i$ eccentrically, so as to act like a lever upon the loose pin $s$ when the disk is turned under the action of the screw.

To remove any one of the cutter-sections from the bar, the screw is turned out a sufficient distance to allow the cam and its abutting pin to be moved back a distance that will bring the securing-rivets of all the cutter-sections in line with the open ends of the slots, when any one of the blades can be forced out of the bar by a punch applied against the edge $f$ of its angular bend at the front edge of the bar, or at the rear edge of the section. To move the cutter-sections for this purpose in the length of the bar, I provide its outer end with an opening, $v$, through which to insert a punch to drive the blades back from that end, so that the open notches will register with the rivets. When a blade is thus removed and a new one put in its place, the screw is turned down and the cam driven hard upon the loose pin, which is thereby driven upon the inner cutter-section, which in turn drives the other blades against each other, and all are driven hard against the solid outer end of the bar and held firmly bound by the lever, cam, and screw. The cam is pivoted within that part of the cutter-bar which forms the eye for the crank-pin rod which operates the cutter, and the cam may be wholly or partly inclosed within the bar.

The back of the cutter-bar may be made closed, and for this purpose the lower bar may be recessed to receive the cutter-blades at the front edge of the bar.

I claim—

1. The combination, with the cutter-bar and its separate cutter-sections removably secured therein, of a binding device for the cutter-sections, consisting of a cam, a loose abutting pin, and an adjusting-screw, substantially as described, for the purpose specified.

2. A cutter-bar having removable cutter-sections secured therein, substantially as described, in combination with a loose pin abutting against the terminal cutter-section, a cam having an abutting face acting against said pin, and a screw abutting against a face of the cam at right angles to said abutting pin, substantially as described, for the purpose specified.

3. The combination, in a bar, of the cutter-sections, each having ∠-shaped slots open at their rear edges and confined in said bar by rivet-pins, with a cam having two faces, an abutting loose pin placed between one of said cam-faces and the said cutter-sections, and a screw acting upon the other cam-face at right angles to said pin, substantially as described, for the purpose specified.

4. The combination, in a cutter-bar having removable cutter-sections, of a loose binding-pin abutting against the terminal cutter-section, and a cam having a face acting against said loose pin, with a screw acting against a self-adjusting seat of said cam, substantially as described, for the purpose specified.

In testimony whereof I have hereunto set my hand in the presence of two subscribing witnesses.

JAMES H. VAN DE WATER.

Witnesses:
   J. F. WADE,
   J. T. PENDLETON.